(12) United States Patent
Chahine et al.

(10) Patent No.: US 8,042,840 B2
(45) Date of Patent: Oct. 25, 2011

(54) SEALED FLEXIBLE COUPLING WITH TORSION ACCEPTANCE

(76) Inventors: Paul Chahine, Dacula, GA (US); Rolf Janssen, Atlanta, GA (US)

( * ) Notice: Subject to any disclaimer, the term of this patent is extended or adjusted under 35 U.S.C. 154(b) by 186 days.

(21) Appl. No.: 12/464,221

(22) Filed: May 12, 2009

(65) Prior Publication Data
US 2009/0284006 A1    Nov. 19, 2009

Related U.S. Application Data

(60) Provisional application No. 61/052,663, filed on May 13, 2008.

(51) Int. Cl.
*F16L 51/02* (2006.01)
(52) U.S. Cl. ........................................... 285/226
(58) Field of Classification Search .................. 285/226, 285/229
See application file for complete search history.

(56) References Cited

U.S. PATENT DOCUMENTS

| | | | | |
|---|---|---|---|---|
| 4,659,117 A | * | 4/1987 | Holzhausen et al. | 285/226 |
| 4,893,847 A | * | 1/1990 | Hess | 285/226 |
| 5,145,215 A | * | 9/1992 | Udell | 285/226 |
| 5,437,479 A | * | 8/1995 | Hartling et al. | 285/226 |
| 5,639,127 A | * | 6/1997 | Davey | 285/226 |
| 5,957,504 A | * | 9/1999 | Cwik | 285/226 |
| 5,967,565 A | * | 10/1999 | Kim | 285/226 |
| 5,971,439 A | * | 10/1999 | Cwik | 285/226 |
| 5,992,896 A | * | 11/1999 | Davey et al. | 285/226 |
| 6,086,110 A | * | 7/2000 | Lee et al. | 285/226 |
| 6,151,893 A | * | 11/2000 | Watanabe et al. | 285/226 |
| 6,164,703 A | * | 12/2000 | Kim | 285/226 |
| 6,296,282 B1 | * | 10/2001 | Burkhardt et al. | 285/226 |
| 6,354,632 B1 | * | 3/2002 | Jung et al. | 285/226 |
| 6,464,258 B2 | * | 10/2002 | Shin | 285/226 |
| 6,669,912 B1 | * | 12/2003 | Udell | 285/226 |
| 6,902,203 B2 | * | 6/2005 | Kang | 285/226 |
| 6,902,204 B2 | * | 6/2005 | Atanasoski et al. | 285/226 |
| 2005/0000206 A1 | | 1/2005 | Simon et al. | |

FOREIGN PATENT DOCUMENTS

| | | |
|---|---|---|
| EP | 1 496 213 A1 | 1/2005 |
| GB | 2 358 686 A | 8/2001 |
| JP | 11-22457 A | 1/1999 |

OTHER PUBLICATIONS

European Patent Office, International Search Report and Written Opinion of the International Searching Authority, International Application No. PCT/US2009/043783, mailed Jul. 17, 2009 (16 pages).

* cited by examiner

*Primary Examiner* — David E Bochna
(74) *Attorney, Agent, or Firm* — Wood, Herron & Evans, LLP

(57) ABSTRACT

A coupling has respective support elements extending respectively from each coupling end toward the other, but not directly connected to each other. Radially oriented ends of these elements define a pocket capturing a cushion therein. A non-metallic bellows operably covers the coupling. An optional thermal shield is disposed between the bellows and the support element.

11 Claims, 3 Drawing Sheets

SEALED FLEXIBLE COUPLING WITH TORSION ACCEPTANCE

RELATED APPLICATION

Applicant claims priority of U.S. provisional patent application Ser. No. 61/052,663 filed on May 13, 2008 and entitled "SEALED FLEXIBLE ELEMENT WITH TORSION ACCEPTANCE", which application is incorporated herein by reference.

FIELD OF THE INVENTION

This invention relates to couplings for internal combustion engine exhausts and more particularly to such sealed couplings which accommodate bending and torsion of the exhaust components which are coupled.

BACKGROUND OF THE INVENTION

It is known to operatively couple together pipes or conduits which carry combustion exhausts away from an internal combustion engine such as in an automobile environment. Typical would be the use of a coupling to couple an outlet end of an exhaust manifold to an exhaust pipe, for example.

In the past, such couplings have been designed in an effort to compensate for thermal influences of the system, motion (such as bending or torsion), noise, vibration and harshness ("NVH") and other parameters. In the past, such couplings have including a metallic bellows applied around the coupled joint.

The disadvantage of certain prior devices is they require a metal bellows to achieve a gas tight or semi-gas tight performance, and to resist the heat inherent in an exhaust system. The metal bellows has limited motion capabilities and increases the overall length and weight of the product to achieve the necessary motion compensation, in particular, bending and torsion. The metal bellows is not able to accept high torsion environments and must resist the torsion when the torsion would create deformation of the bellows. This adds cost and/or weight to the bellows and transfers the torsion strains downstream into the exhaust system for other portions of the exhaust system to compensate for them.

Also, the disadvantage of the prior device is that metal bellows are very expensive and must use high nickel alloys in the stainless steel material to achieve the desired performance.

SUMMARY OF THE INVENTION

It is desirable to provide a flexible coupling for an internal combustion or automotive exhaust system which provides increased accommodation of system bending and torsion, which does not deform when subjected to bending and torsion of the system, and which provides semi- or gas tight performance, which is lighter and less costly than prior couplings with metallic bellows, which does not unduly transmit torsion and bending strains downstream into the exhaust system.

To these ends, a coupling according to the invention contemplates support elements for attachment to exhaust system pipes, a dampener apparatus and a non-metallic bellows disposed over these support elements and dampener apparatus. The use of a non-metallic bellows over the support attachments and dampening mechanism achieves the sealed flexible element with torsion acceptance.

In higher heat environments, a thermal insulation is added between the support/dampening mechanism and the non-metallic bellows.

The non-metallic bellows can be fixed to the support elements in a number of ways such as with two metallic rings that fix the bellows (and thermal insulation) to the elements on each end.

The insulation (fiberglass, composite, etc.) and the non-metallic bellows (rubber, plastic, composites, etc.) can be of a number of different materials. For applications where gas tightness is not required at all, the non-metallic bellows and insulation can be optionally removed.

The geometry of the bellows can be made in a variety of ways to match the application needs.

One or more dampening mechanisms can be attached in series within this application The non-metallic bellows of the invention are able to accept high bending and torsion requirements of the exhaust system.

The non-metallic bellows of the invention are far less expensive since they do not contain the steel or metallic bellows of prior system.

The sealed flexible element with torsion acceptance of the invention allows for a gas tight or semi-gas tight flexible connection that is capable of compensating, and performing the benefits of, compensating thermal influences, motion (such as bending), reducing or suppressing noise vibration and harshness (NVH), and other such concerns.

According to the invention, the support elements that may in part define the dampening mechanism are internal to a non-metallic diaphragm or bellows. Where high heat conditions exist, the non-metallic bellows is protected by a thermal insulator which is attached between the bellows and the internal support elements. This allows for the NVH dampening properties with a significantly larger range of motions (particularly bending and torsion) and lower cost and size compared to prior devices. The invention can be made with a variety of materials and with any number of plies thickness of the materials.

This invention thus eliminates the metal bellows of prior devices and replaces this with a non-metallic bellows and (in higher heat conditions) thermal insulation. This allows for a greater range of motion (particularly bending and torsion) in a smaller size and allows for the similar NVH dampening at a lower overall weight and cost.

These and other benefits and advantages will be readily apparent from the following written description and from the drawings in which:

DETAILED DESCRIPTION OF THE INVENTION

It should be readily understood that the components of the invention, as generally described and illustrated in the Figures herein and accompanying text, can be arranged and designed in a wide variety of different configurations while still utilizing the inventive concept. Thus, the following more detailed description of the preferred embodiments of the system and method for the present invention, as presented in the Figures and accompanying text, is not intended to limit the scope of the invention, as claimed, but it is merely representative of the presently preferred embodiments of the invention.

The preferred embodiments of the invention will be best understood by reference to the drawings wherein like parts or steps are designated by like numerals throughout.

Figure 1:
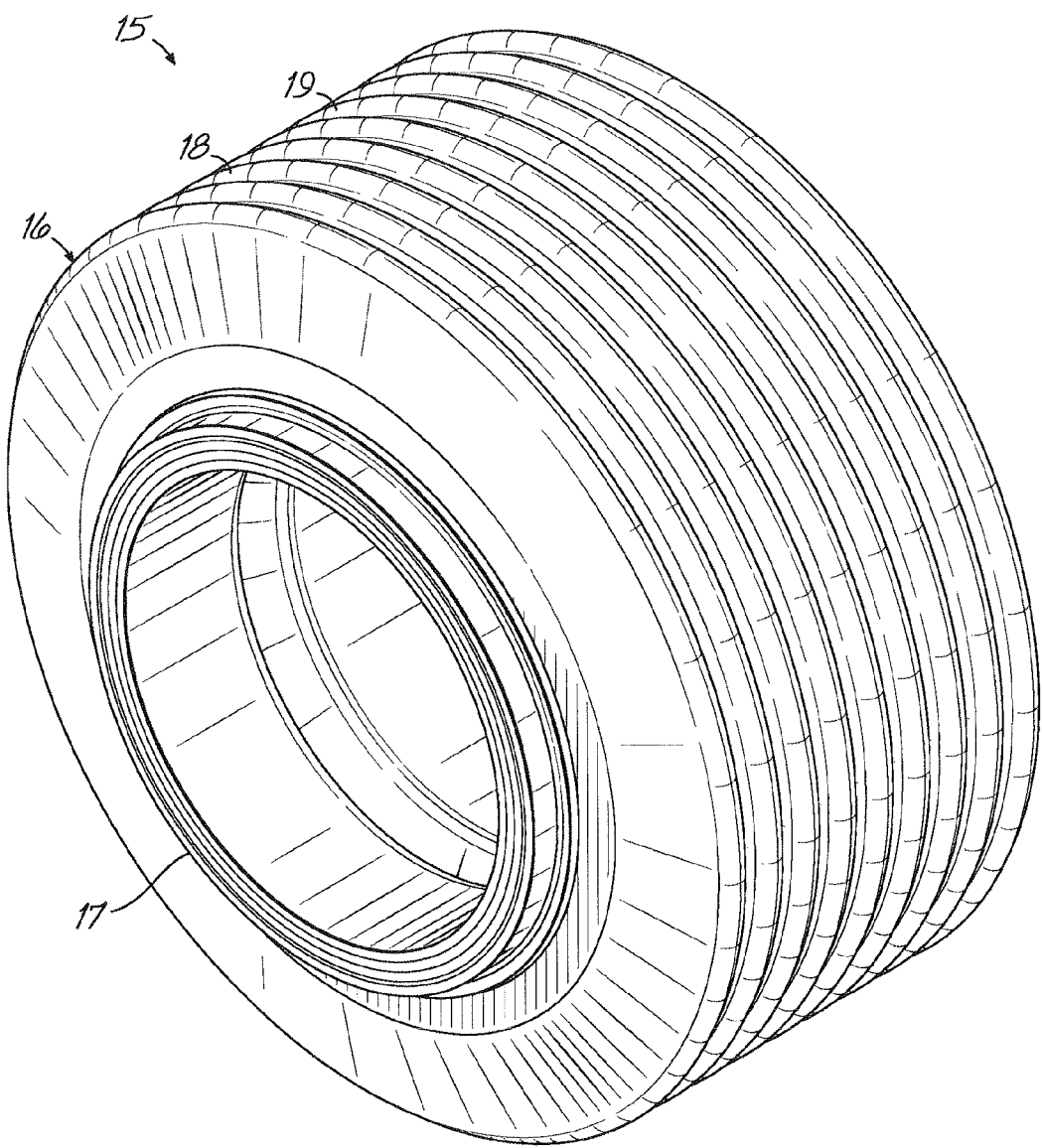
FIG. 1 is an isometric exterior view of the flexible bellows coupling according to the invention.

Turning now to FIG. 1, there is shown therein a flexible coupling 15 according to the invention. Coupling 15 preferably includes a non-metallic bellows or diaphragm 16 having an end 17 connectable to a pipe or conduit (not shown in FIG. 1). It will be appreciated that bellows 16 comprises a plurality of convolutions such as at 18, 19, in any suitable number given the overall length of the coupling 15.

Figure 1A:
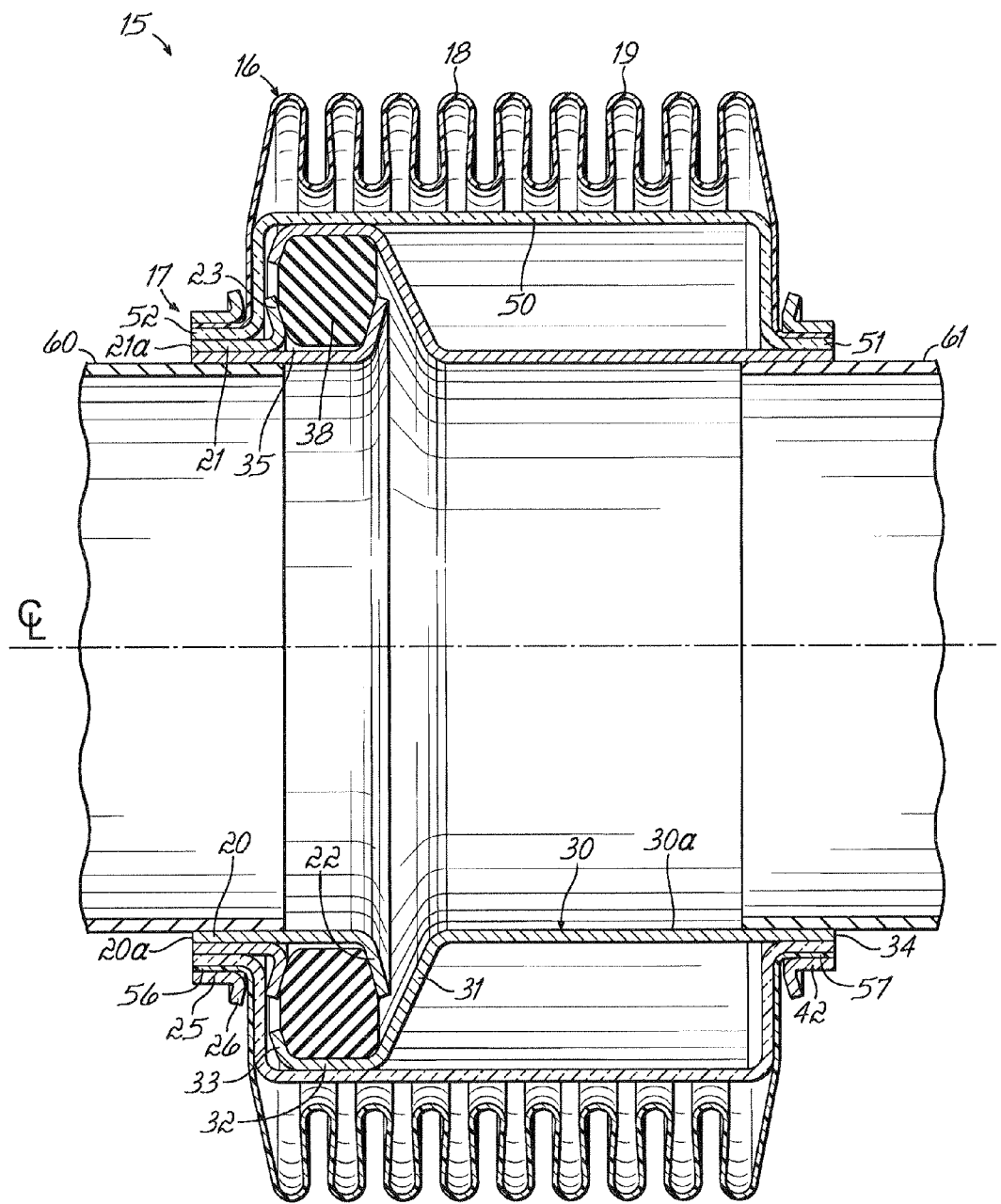
FIG. 1A is a full cross-sectional view of the bellows of FIG. 1 displaying the various components and their location in the coupling.

Coupling 15 includes several elongated support elements generally extending in an axial direction (or in a direction parallel to an axial direction) as the center line or axis CL (FIG. 1A). At one end of coupling 15, two support elements 20, 21 extend axially (see FIG. 1B). Element 20 includes radially outward extending flange 22 while element 21 includes radially outward extending flange 23. At the ends of coupling 15, respective ends 20a, 21a of these elements are co-extensive.

Another elongated axially extending support element 30 includes an outwardly flared end comprising portions 31 and 32. Portion 32 includes an inwardly directed flange 33.

Figure 1B:
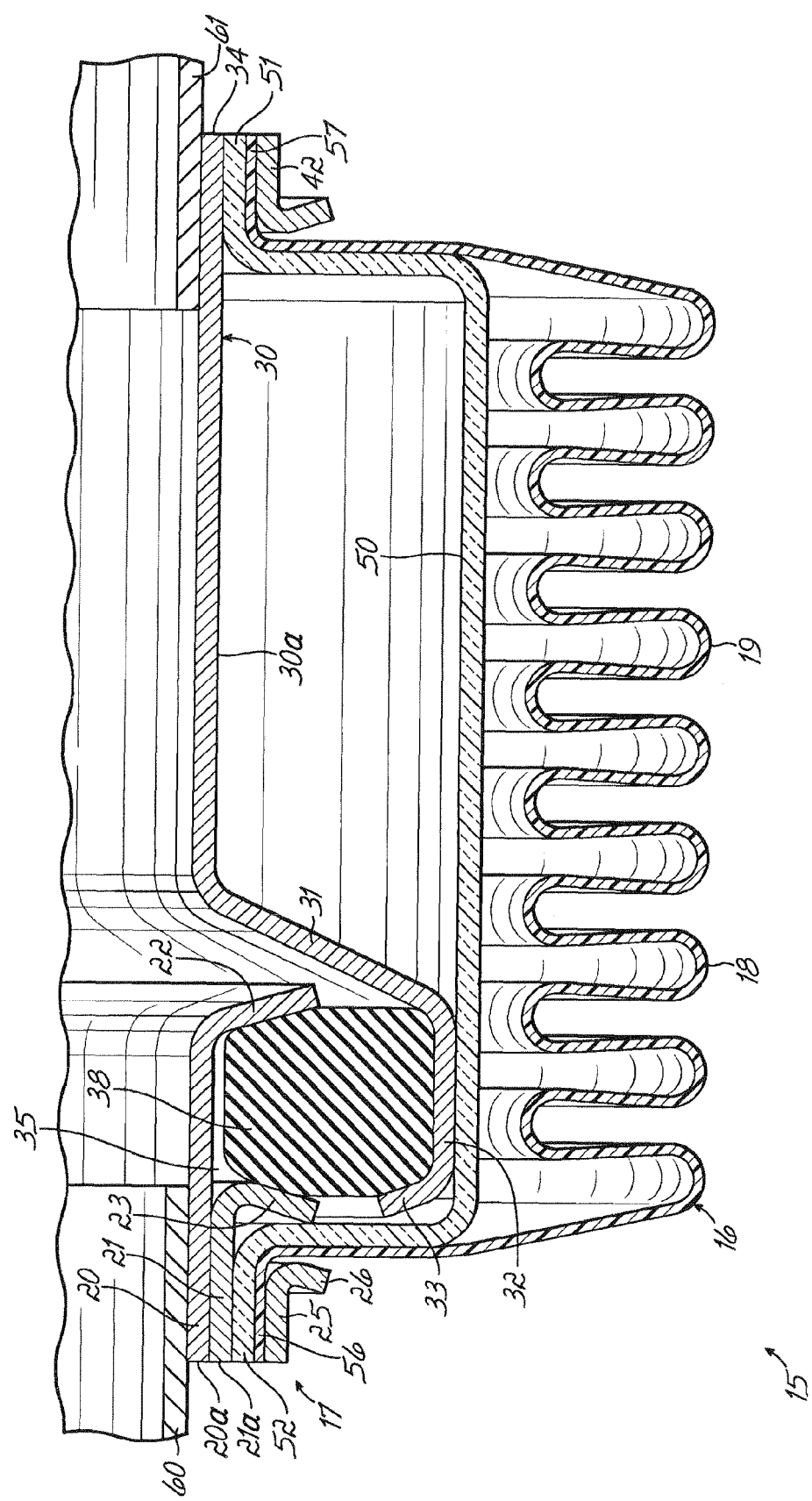
FIG. 1B is an amplified view of a portion of FIG. 1A illustrating components thereof in larger scale for clarity.

As best seen in FIG. 1B, portions 31, 32 and flange 33 form, with flanges 22, 23, a pocket 35. It will be appreciated that, as the coupling elements 20, 21 and 30 described are generally cylindrical, pocket 35 is in the form of an annulus about centerline or axis CL (FIG. 1A).

It will further be appreciated that element 30 is longitudinally axially extended at 30a to another element end 34 at a far end of coupling 15, and is not directly connected to elements 20 21 at the other end.

Preferably a dampener or cushion 38, also in the form of an annulus, is captured in pocket 35 as shown in FIGS. 1A, 1B. Damper 38 is preferably a yieldable material of rubber or a synthetic, while any suitable damping material can be used.

Optionally, a thermal insulating elongated and axially extending sleeve 50 is disposed between the opposite ends of coupling 15. Sleeve 50 has an axially extending flange 51 at one end and a similar flange 52 at the other end for securing sleeve 50 in place at both ends of the coupling.

Non-metallic bellows 16 also includes an axially extending flange 56 at one end of the bellows and an axially extending flange 57 at another end of the bellows for securing the bellows at the coupling ends.

Finally, compression rings 25 and 42 are respectively disposed at respective ends of the coupling to secure the components together. Ring 25 has a radially outward extending flange 26 (FIG. 1B) and ring 42 has a radially outward extending flange 27. Rings 25, 42 are compressed, drawn or otherwise tightened about the radially inward components shown, to secure them together and, respectively, to ends of exhaust pipes 60, 61 (shown for illustration infringement FIG. 1A), which coupling 15 operably couples together.

In particular, ring 25 is secured to capture bellows flange 56, thermal sleeve flange 52, support element 21 and support element 20 about pipe 60. Ring 42 is secured to capture bellows flange 57, thermal sleeve flange 51 and end 34 of support element 30 about the end of pipe 61 to complete the application of the coupling 15 operable connecting pipes 60, 61.

It will be appreciated that the bellows 16 optional insulator sleeve 50, elements 20, 21 and 30, and rings 25, 42 are all generally cylindrical in nature, fitting together in appropriate relation as described and shown in the FIGS. and secured via any conventional means.

Coupling 15 is secured to pipes 60, 61 by friction, ring, clamps, compression, welding or any other conventional means.

It will be appreciated that FIG. 1B illustrates, in larger scale, an end of coupling 15 in cross-section and nearest pipe 60 (FIG. 1A) at one side of center line CL.

Accordingly, at least one damping cushion 38 is captured by elements 20, 21, 30. The elements and cushion 38 form the support and create the dampening characteristics of the coupling 15. The coupling 15 can absorb or accept movements (and forces) in the bending, axial, and torsion directions. Without the bellows 16, the coupling may not be completely gas tight or semi gas tight. To achieve greater gas tightness, the coupling 15 is surrounded by a non-metallic diaphragm or non-metallic bellows 16. The non-metallic bellows 16 will also protect the mechanism from the harsh outer environment (such as from corrosive materials, from stone or other object impingements, or from other debris that can be absorbed/accepted by the cushion). The non-metallic bellows 16 can be attached to the support elements in many ways. One such means is with two rings 25, 42, that are calibrated to the support elements and thus mechanically fix the bellows to the support elements at either end of coupling 15. Where higher heat environments exist, a thermal insulator 50 is inserted between the non-metallic bellows and the support elements. The insulator 50 serves the primary function to protect the non-metallic bellows but it can also add to the dampening features of the coupling 15. It is preferably trapped between the non-metallic bellows and the support elements as shown in the FIGS.

While pipes 60, 61 are preferably coaxial, the flexibility of coupling 15 readily accommodates or compensates off-axial alignment or bending of pipes 60, 61 and relative torsion between them without derogation of coupling 15, while accommodating high heat applications, providing gas tight or semi-gas tight coupling and suppressing NVH of the gas flow system in which it is used at smaller, lighter weight and less costly parameters than prior known systems.

These and other alternatives, modifications and advantages will become readily apparent to those of ordinary skill in the field to which this invention pertains and applicant intends to be bound only by the claims appended hereto.

What is claimed is:

1. A flexible coupling for use in automotive exhaust systems and comprising:
   a plurality of elongated elements extending from and between respective ends of said coupling;
   at least a first element of said plurality of elongated elements extending from one of said ends being spaced from a second element of said plurality of elongated elements extending from another of said coupling ends;
   complementary end portions of said first and said second elements defining a cushion holding pocket therebetween;
   a cushion captured in said pocket between said end portions of said elongated first and second elements, said element end portions extending about said cushion from respective ends of said coupling;
   a non-metallic bellows having respective bellows ends and extending from one end of said coupling to another end thereof and attached at its bellows ends to respective ends of said coupling;
   one of said first and second elements also defining an innermost wall of said coupling; and said plurality of elongated elements including a third element oriented proximate and extending from one end of said coupling ends toward said another coupling end and partially defining said cushion holding pocket together with said first and second elements.

2. A coupling as in claim 1 further including rings surrounding and holding ends of said non-metallic bellows to other elements of said coupling.

3. A coupling as in claim 2 further comprising a thermal insulating sleeve disposed between said non-metallic bellows and respective ones of said plurality of elements.

4. A coupling as in claim 1 wherein said cushion is an annulus.

5. A coupling as in claim 1 wherein said first element is operably attachable to a first pipe and said second element is operably attachable to a second pipe.

6. A coupling as in claim 5 wherein said coupling, when so attached, operably isolates motion of one of said pipes from another of said pipes.

7. A coupling as in claim 5 wherein said coupling, when so attached, operably dampens forces extended from one of said pipes to another of said pipes.

8. A coupling as in claim 1, said bellows covering said first, second and third elements.

9. A coupling as in claim 8 further including a thermal insulating sleeve disposed between said bellows and said first, second and third elements.

10. A coupling as in claim 1 wherein said coupling is disposed between ends of two exhaust pipes, said bellows accommodating torsional, bending, axial displacement and radial displacement of said pipes.

11. A coupling as in claim 1 wherein respective ends of said first and second support elements are oriented radially of each other and cooperatively define a pocket capturing said cushion.

* * * * *